United States Patent
Kang et al.

(10) Patent No.: US 8,131,253 B2
(45) Date of Patent: Mar. 6, 2012

(54) SYSTEM AND METHOD FOR PROVIDING AN EMERGENCY SERVICE IN A COMMUNICATION SYSTEM

(75) Inventors: Hyun-Jeong Kang, Seoul (KR);
Yeong-Moon Son, Yongin-si (KR);
Jung-Hoon Cheon, Suwon-si (KR);
Chan-Ho Min, Yongin-si (KR)

(73) Assignee: Samsung Electronics Co., Ltd, Suwon-si (KR)

( * ) Notice: Subject to any disclaimer, the term of this patent is extended or adjusted under 35 U.S.C. 154(b) by 536 days.

(21) Appl. No.: 12/354,618

(22) Filed: Jan. 15, 2009

(65) Prior Publication Data
US 2009/0186594 A1    Jul. 23, 2009

(30) Foreign Application Priority Data

Jan. 18, 2008 (KR) .................. 10-2008-0005893
May 9, 2008 (KR) .................. 10-2008-0043566
Jun. 2, 2008 (KR) .................. 10-2008-0051818

(51) Int. Cl.
*H04M 11/04* (2006.01)
(52) U.S. Cl. .................. 455/404.1; 370/329
(58) Field of Classification Search .......... 370/329; 455/404.1, 404.2, 450
See application file for complete search history.

(56) References Cited

U.S. PATENT DOCUMENTS

| | | | |
|---|---|---|---|
| 2005/0111630 A1 | 5/2005 | Potorny et al. | |
| 2005/0195756 A1* | 9/2005 | Frattura | 370/259 |
| 2007/0004378 A1 | 1/2007 | Muhonen | |
| 2008/0008157 A1 | 1/2008 | Edge et al. | |
| 2008/0009262 A1 | 1/2008 | Rudolf et al. | |
| 2008/0153453 A1* | 6/2008 | Bachmutsky | 455/404.1 |
| 2009/0186594 A1* | 7/2009 | Kang et al. | 455/404.1 |
| 2010/0135205 A1* | 6/2010 | Li et al. | 370/328 |

* cited by examiner

*Primary Examiner* — Lewis West
(74) *Attorney, Agent, or Firm* — Jefferson IP Law, LLP

(57) ABSTRACT

A system and method for providing an emergency service in a communication system are provided. The method includes transmitting a request message for requesting connection setup for service provision from a first station to a second station, the request message including a first indicator indicating an emergency service; receiving a response message in response to the request message by the first station from the second station, the response message including service flow connection information for provision of the emergency service and a second indicator indicating that it is a response to the request message, acquiring the service flow connection information from the response message and transmitting a message acknowledging acquisition of the service flow connection information to the second station, and setting a connection for providing the emergency service.

28 Claims, 8 Drawing Sheets

SYSTEM AND METHOD FOR PROVIDING AN EMERGENCY SERVICE IN A COMMUNICATION SYSTEM

PRIORITY

This application claims the benefit under 35 U.S.C. §119(a) of Korean patent applications filed in the Korean Intellectual Property Office on Jan. 18, 2008, May 9, 2008, and Jun. 2, 2008, and respectively assigned Serial Nos. 10-2008-0005893, 10-2008-0043566, and 10-2008-0051818, the entire disclosures of which are hereby incorporated by reference.

BACKGROUND OF THE INVENTION

1. Field of the Invention

The present invention relates to a system and a method for providing an emergency service in a communication system. More particularly, the present invention relates to a system and a method for providing an emergency service to a mobile station operating in an idle mode in a communication system.

2. Description of the Related Art

For next generation communication systems, studies are in progress to provide a service allowing high-speed large-capacity data transmission/reception to Mobile Stations (MSs). Representative examples of such next generation communication systems include a communication system based on an Institute of Electrical and Electronics Engineers (IEEE) 802.16 standard (hereafter referred to as an IEEE 802.16 communication system) and a Mobile Worldwide Interoperability for Microwave Access (WiMAX) communication system. The Mobile WiMAX communication system is based on the IEEE 802.16 communication system. In the IEEE 802.16 communication system, power consumption of the MS is an important factor since it has a large influence on the performance of the entire system. Therefore, the IEEE 802.16 communication system supports an idle mode operation in order to minimize the power consumption of an MS. Hereinafter, the idle mode operation will be briefly described.

When a Mobile Station (MS) does not have any traffic to transmit to or receive from a Base Station (BS), the MS releases a network connection with the BS and shifts to an idle mode. Then, if there is uplink traffic to be transmitted to the BS or if the MS receives an indicator indicating that there is downlink traffic from the BS, the MS performs a network reconnection setup operation in order to shift to an active mode from the idle mode. Further, when the MS in idle mode has determined that an emergency service is to be provided, such as an emergency call or an emergency message, the MS must perform an emergency service connection setup operation with the BS.

FIG. 1 is a signal flow diagram illustrating a process in which an MS in an idle mode performs an emergency service connection setup operation with a BS in a conventional IEEE 802.16 communication system.

Referring to FIG. 1, the MS 100 transmits a ranging code to the BS 110 in order to perform an emergency service connection setup operation in step 101. The ranging codes used in the conventional IEEE 802.16 communication system can be divided into initial ranging codes, periodic ranging codes, bandwidth request ranging codes, and handover ranging codes, according to purposes of their use, and it is assumed that the ranging code transmitted in step 101 is one of handover ranging codes included in a handover ranging code set. Upon receiving the ranging code, the BS 110 allocates an uplink bandwidth for transmission of a ranging request message to the MS 100 in step 103, and the MS 100 transmits the ranging request message including IDentifier (ID) information of the MS to the BS 110 by using the allocated uplink bandwidth in step 105.

Upon receiving the ranging request message, the BS 110 sets a route for service traffic transmission of the MS 100 and entities of a backbone network in step 107, and transmits a ranging response message in step 109. The ranging response message includes a basic Connection IDentifier (CID) of the MS 100, and may include CID information corresponding to a service flow set by the MS 100 before its transition into the idle mode.

Upon receiving the ranging response message, the MS 100 transmits a service flow setup request message, which requests setup of a service flow for providing an emergency service, to the BS 110 in step 111. Upon receiving the service flow setup request message, the BS 110 sets a service flow for providing an emergency service of the MS 100 and entities of a backbone network in step 113, and transmits a service flow setup response message to the MS 100 in step 115. Upon receiving the service flow setup response message, the MS 100 transmits an acknowledgement message with respect to the service flow setup response message to the BS 110 in step 117. Thereafter, the MS 100 and the BS 110 transmit/receive emergency service data by using the service flow set in step 113 in step 119.

SUMMARY OF THE INVENTION

An aspect of the present invention is to address at least the above-mentioned problems and/or disadvantages and to provide at least the advantages described below. Accordingly, an aspect of the present invention is to provide a system and a method for providing an emergency service in a communication system.

Another aspect of the present invention is to provide a system and a method for providing an emergency service to a mobile station operating in an idle mode in a communication system.

In accordance with an aspect of the present invention, an emergency service providing system in a communication system is provided. The system includes a first station and a second station, wherein the first station transmits a request message for requesting connection setup for service provision to the second station, the request message including a first indicator indicating an emergency service, receives a response message in response to the request message from the second station, the response message including service flow connection information for provision of the emergency service and a second indicator indicating that it is a response to the request message, acquires the service flow connection information from the response message, and transmits a message acknowledging acquisition of the service flow connection information to the second station.

In accordance with another aspect of the present invention, an emergency service providing system in a communication system is provided. The system includes a mobile station and a base station, wherein the mobile station transmits a predefined ranging code to the base station when determining that the emergency service is to be provided, receives information on an uplink band allocated to the mobile station from the base station, transmits a first message requesting a connection in order to provide the emergency service through the uplink band, receives a second message, which includes indicator information indicating that it is a response to the request for a connection in order to provide the emergency service, from the base station, transmits a request message for requesting connection setup for service provision to the base station, the request message including a first indicator indicating an emergency service, receives a response message from the base station, the response message including service flow connection information for provision of the emergency service and a second indicator indicating that it is a response to the request message, acquires the service flow connection information from the response message, transmits an message acknowledging acquisition of the service flow connection information to the base station, and sets a connection for providing the emergency service.

In accordance with yet another aspect of the present invention, an emergency service providing system in a communication system is provided. The system includes a mobile station and a base station, wherein the base station receives a predefined ranging code from the mobile station, allocates an uplink band for the mobile station, transmits information on the uplink band to the mobile station, receives a first message, which requests a connection in order to provide the emergency service, from the mobile station through the uplink band, transmits a second message, which includes indicator information indicating that it is a response to the request for a connection in order to provide the emergency service, to the mobile station, receives a request message for requesting connection setup for service provision from the mobile station, the request message including a first indicator indicating an emergency service, transmits a response message to the mobile station, the response message including service flow connection information for provision of the emergency service and a second indicator indicating that it is a response to the request message, receives an acknowledgment message, which acknowledges acquisition of the service flow connection information from the response message, from the mobile station, and sets a connection for providing the emergency service.

In accordance with still another aspect of the present invention, an emergency service providing system in a communication system is provided. The system includes a mobile station and a base station, wherein the mobile station transmits a predefined ranging code to a base station when determining that the emergency service is to be provided, receives information on an uplink band allocated to the mobile station from the base station, transmits a first message requesting a connection in order to provide the emergency service through the uplink band, receives a second message, which includes at least one of indicator information indicating that it is a response to the request for a connection in order to provide the emergency service, service flow connection information for provision of the emergency service, information on a Channel Quality Information (CQI) channel, from the base station, and provides the emergency service by using the service flow connection information.

In accordance with a further aspect of the present invention, an emergency service providing system in a communication system is provided. The system includes a mobile station and a base station, wherein the base station receives a predefined ranging code from a mobile station, allocates an uplink band for the mobile station, transmits information on the uplink band to the mobile station, receives a first message, which requests a connection in order to provide the emergency service, from the mobile station through the uplink band, and transmits a second message, which includes at least one of indicator information indicating that it is a response to the request for a connection in order to provide the emergency service, service flow connection information for provision of the emergency service, information on a CQI channel, to the mobile station.

In accordance with still a further aspect of the present invention, a method of providing an emergency service in a communication system is provided. The method includes transmitting a request message for requesting connection setup for service provision from a first station to a second station, the request message including a first indicator indicating an emergency service; receiving a response message in response to the request message by the first station from the second station, the response message including service flow connection information for provision of the emergency service and a second indicator indicating that it is a response to the request message, acquiring the service flow connection information from the response message and transmitting a message acknowledging acquisition of the service flow connection information to the second station, and setting a connection for providing the emergency service.

In accordance with another aspect of the present invention, a method of providing an emergency service by a mobile station in a communication system is provided. The method includes transmitting a predefined ranging code to a base station when the mobile station has determined that the emergency service is to be provided, after transmitting the predefined ranging code, receiving information on an uplink band allocated to the mobile station from the base station, transmitting a first message requesting a connection in order to provide the emergency service through the uplink band, receiving a second message, which includes indicator information indicating that it is a response to the request for a connection in order to provide the emergency service, from the base station, after receiving the second message, transmitting a request message for requesting connection setup for service provision to the base station, the request message including a first indicator indicating an emergency service, receiving a response message from the base station, the response message including service flow connection information for provision of the emergency service and a second indicator indicating that it is a response to the request message, acquiring the service flow connection information from the response message, and transmitting a message acknowledging acquisition of the service flow connection information to the base station, and setting a connection for providing the emergency service.

In accordance with still another aspect of the present invention, a method of providing an emergency service by a base station in a communication system is provided. The method includes receiving a predefined ranging code from a mobile station, after receiving the predefined ranging code, allocating an uplink band for the mobile station and transmitting information on the uplink band to the mobile station, after transmitting the information on the uplink, receiving a first message, which requests a connection in order to provide the emergency service, from the mobile station through the uplink band, transmitting a second message, which includes indicator information indicating that it is a response to the request for a connection in order to provide the emergency service, to the mobile station, after transmitting the second message, receiving a request message for requesting connection setup for service provision from the mobile station, the request message including a first indicator indicating an emergency service, transmitting a response message to the mobile station, the response message including service flow connection information for provision of the emergency service and a second indicator indicating that it is a response to the request message, receiving an acknowledgment message, which acknowledges acquisition of the service flow connection information from the response message, from the mobile station, and setting a connection for providing the emergency service.

In accordance with yet another aspect of the present invention, a method of providing an emergency service by a mobile station in a communication system is provided. The method includes transmitting a predefined ranging code to a base station when the mobile station has determined that the emergency service is to be provided, after transmitting the predefined ranging code, receiving information on an uplink band allocated to the mobile station from the base station, transmitting a first message requesting a connection in order to provide the emergency service through the uplink band, after transmitting the first message, receiving a second message, which includes at least one of indicator information indicating that it is a response to the request for a connection in order to provide the emergency service, service flow connection information for provision of the emergency service, information on a CQI channel, from the base station, and providing the emergency service by using the service flow connection information.

In accordance with a further aspect of the present invention, a method of providing an emergency service by a base station in a communication system is provided. The method includes receiving a predefined ranging code from a mobile station, after receiving the predefined ranging code, allocating an uplink band for the mobile station and transmitting information on the uplink band to the mobile station, after transmitting the information on the uplink, receiving a first message, which requests a connection in order to provide the emergency service, from the mobile station through the uplink band, and transmitting a second message, which includes at least one of indicator information indicating that it is a response to the request for a connection in order to provide the emergency service, service flow connection information for provision of the emergency service, information on a CQI channel, to the mobile station.

Other aspects, advantages, and salient features of the invention will become apparent to those skilled in the art from the following detailed description, which, taken in conjunction with the annexed drawings, discloses exemplary embodiments of the invention.

BRIEF DESCRIPTION OF THE DRAWINGS

The above and other aspects, features and advantages of certain exemplary embodiments of the present invention will be more apparent from the following description taken in conjunction with the accompanying drawings, in which.

Throughout the drawings, it should be noted that like reference numbers are used to depict the same or similar elements, features and structures.

DETAILED DESCRIPTION OF EXEMPLARY EMBODIMENTS

The following description with reference to the accompanying drawings is provided to assist in a comprehensive understanding of exemplary embodiments of the invention as defined by the claims and their equivalents. It includes various specific details to assist in that understanding but these are to be regarded as merely exemplary. Accordingly, those of ordinary skill in the art will recognize that various changes and modifications of the embodiments described herein can be made without departing from the scope and spirit of the invention. In addition, descriptions of well-known functions and constructions are omitted for clarity and conciseness.

The terms and words used in the following description and claims are not limited to the bibliographical meanings, but, are merely used by the inventor to enable a clear and consistent understanding of the invention. Accordingly, it should be apparent to those skilled in the art that the following description of exemplary embodiments of the present invention are provided for illustration purpose only and not for the purpose of limiting the invention as defined by the appended claims and their equivalents.

It is to be understood that the singular forms "a," "an," and "the" include plural referents unless the context clearly dictates otherwise. Thus, for example, reference to "a component surface" includes reference to one or more of such surfaces.

Exemplary embodiments of the present invention propose a system and a method for providing an emergency service in a communication system. In addition, exemplary embodiments of the present invention propose a system and a method for providing an emergency service to a mobile station operating in an idle mode in a communication system. A system and a method for providing an emergency service can be applied to not only a mobile station in an idle mode as described above but also a mobile station operating in a communication mode or performing handover. The following description of exemplary embodiments of the present invention is based on a communication system using an Institute of Electrical and Electronics Engineers (IEEE) 802.16 standard (hereafter referred to as an IEEE 802.16 communication system). However, the system and method for providing an emergency service proposed by exemplary embodiments of the present invention can be applied to other communication systems, such as a Mobile Worldwide Interoperability for Microwave Access (WiMAX) communication system.

Figure 1:
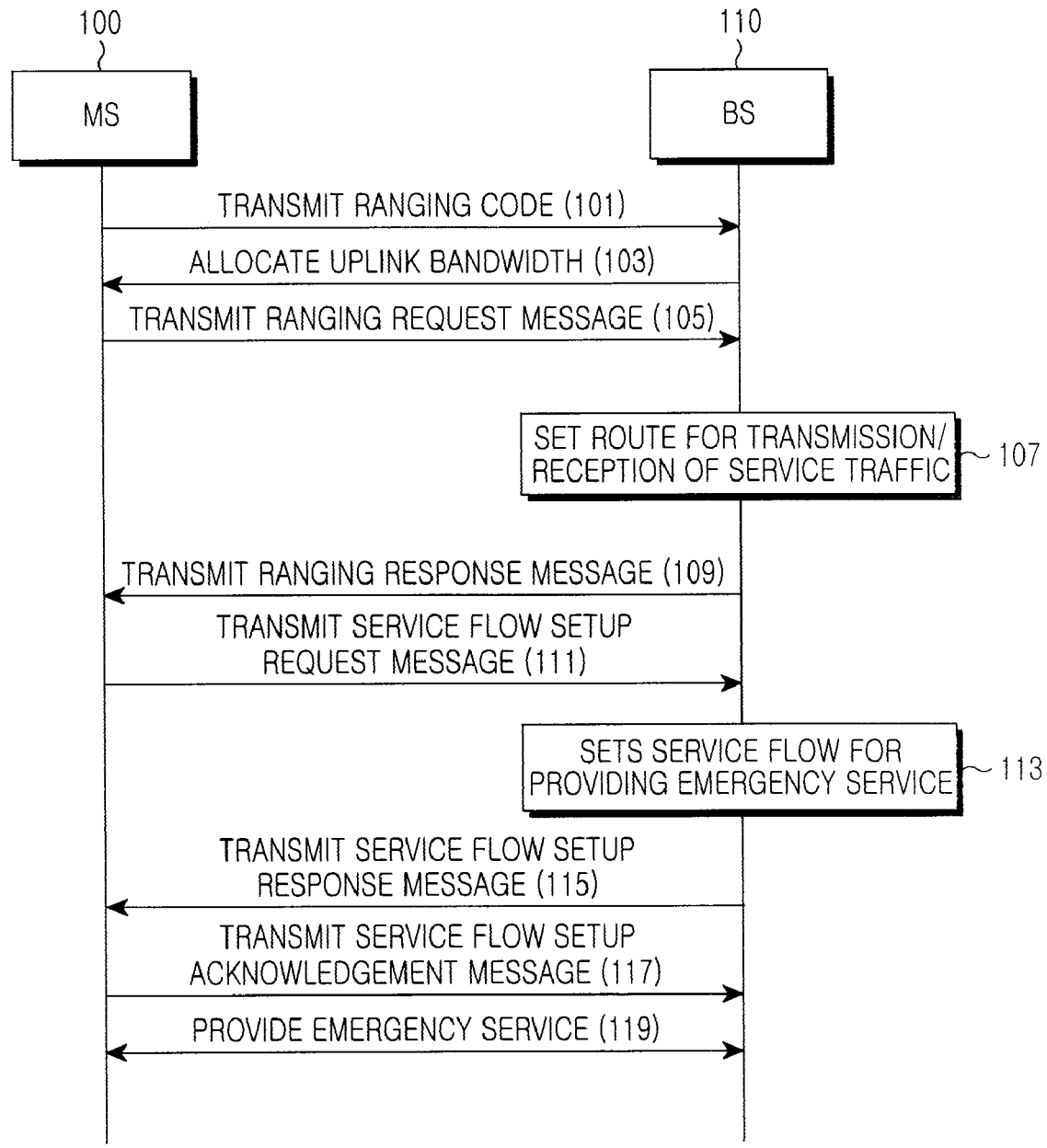
FIG. 1 is a signal flow diagram illustrating a process in which an MS in an idle mode performs an emergency service connection setup operation with a BS in a conventional IEEE 802.16 communication system.
Figure 2:
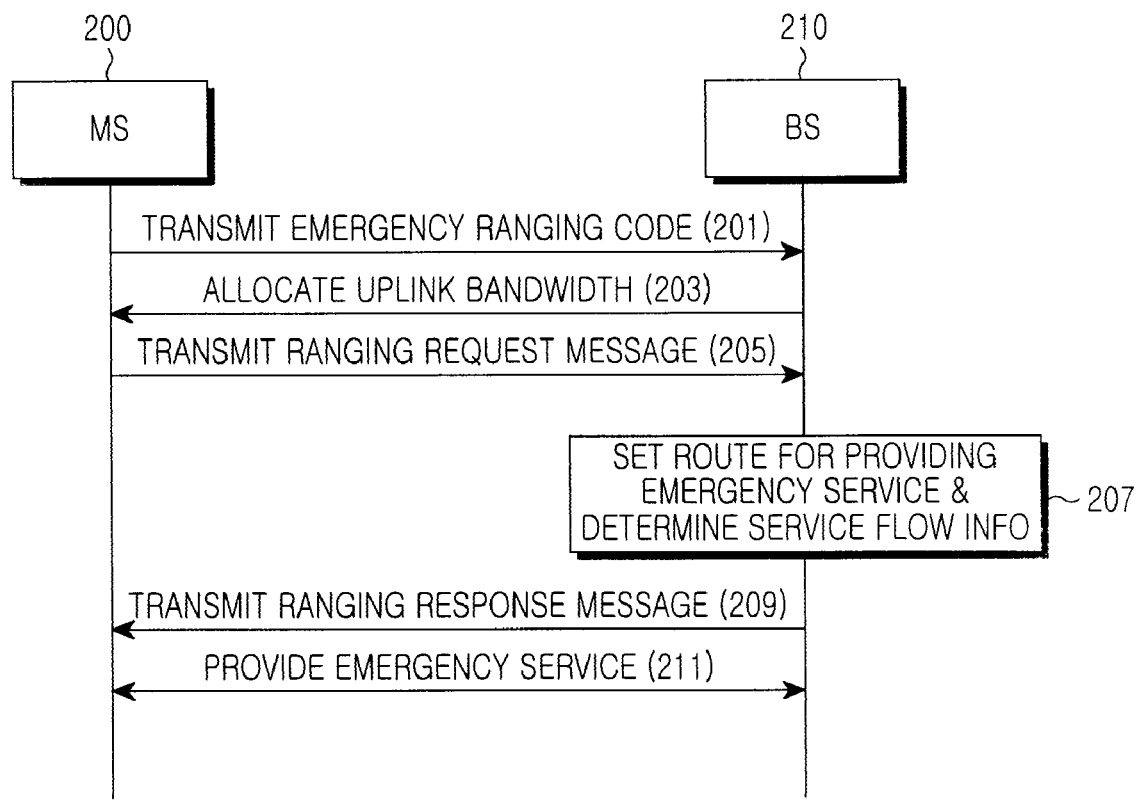
FIG. 2 is a signal flow diagram illustrating a process of providing an emergency service in an IEEE 802.16 communication system according to an exemplary embodiment of the present invention.

FIG. 2 is a signal flow diagram illustrating a process of providing an emergency service in an IEEE 802.16 communication system according to an exemplary embodiment of the present invention.

Referring to FIG. 2, a process of providing an MS-triggered emergency service triggered by a mobile station will be described below. For convenience of description, a connection for providing the emergency service is referred to as an "emergency service connection" in the following description.

Referring to FIG. 2, the MS 200 transmits an emergency ranging code, which is newly proposed by exemplary embodiments of the present invention, to the BS 210 in order to set a connection for providing an emergency service, such as an emergency call and transmission/reception of an emergency message in step 201. The emergency ranging code will be briefly described below.

In a conventional IEEE 802.16 communication system, the ranging codes can be divided into initial ranging codes, periodic ranging codes, bandwidth request ranging codes, and handover ranging codes, according to purposes of their use. However, exemplary embodiments of the present invention propose an emergency ranging code to be used in providing an emergency service. When there are L ranging codes that can be used by the BS, M ranging codes from among the L ranging codes are determined as the emergency ranging codes.

Further, the emergency ranging code has a higher priority than the other ranging codes, which include the initial ranging code, the periodic ranging code, the bandwidth request ranging code, and the handover ranging code. Therefore, when the BS 210 receives other ranging codes together with the emergency ranging code, the BS 210 first performs an operation according to the emergency ranging code. Meanwhile, in a communication system in which the emergency ranging code is not defined, the MS 200 transmits an initial ranging code or a handover ranging code to the BS 210.

The BS 210 allocates an UpLink (UL) bandwidth for transmission of a ranging request message to the MS 200 having transmitted the emergency ranging code in step 203.

Then, the MS 200 transmits a ranging request message including IDentification (ID) information of the MS 200 itself and emergency service indicator information indicating an emergency service connection setup request to the BS 210 by using the allocated uplink bandwidth in step 205. The ranging request message may include Quality of Service (QoS) parameter information and global service class name information corresponding to the emergency service requested by the MS 200. Further, the emergency service indicator information can be expressed by using one particular bit from among bits included in a ranging purpose indicator field of the ranging request message or one particular bit from among bits included in a header of the ranging request message.

Upon receiving the ranging request message, the BS 210 sets a route for providing an emergency service of the MS 200, with entities of a backbone network, and determines service flow information for providing the emergency service and CID information corresponding to the service flow in step 207. The service flow information includes at least one of a service flow identifier, a QoS parameter value, and a global service class name. Further, when the service flow information includes only the service flow identifier, the QoS parameter value and the global service class name may be predefined according to the traffic type of the emergency service.

When the service flow information includes the QoS parameter value and the global service class name, the QoS parameter value and the global service class name may not be predefined according to the traffic type of the emergency service.

Moreover, all of the service flow identifier, the QoS parameter value, and the global service class name may be predefined according to the traffic type of the emergency service. At this time, the service flow identifier may be extracted from an emergency service flow identifier pool managed by the BS 210. The emergency service flow identifier pool refers to a group including service flow identifiers for an emergency service. For example, assume that an emergency service flow identifier pool includes some service flow identifiers ($1^{st}$ group identifiers) from among the entire service flow identifiers. Then, some service flow identifiers ($2^{nd}$ group identifiers) from among the $1^{st}$ group identifiers may be used as service flow identifiers for emergency Unsolicited Grant Service (UGS) traffic, some service flow identifiers ($3^{rd}$ group identifiers) from among the other identifiers except for the $2^{nd}$ group identifiers from among the $1^{st}$ group identifiers may be used as service flow identifiers for emergency extended-real-time Polling Service (ertPS) traffic, some service flow identifiers ($4^{th}$ group identifiers) from among the other identifiers except for the $2^{nd}$ group identifiers and the $3^{rd}$ group identifiers from among the $1^{st}$ group identifiers may be used as service flow identifiers for emergency real-time Polling Service (rtPS) traffic, some service flow identifiers ($5^{th}$ group identifiers) from among the other identifiers except for the $2^{nd}$ to $4^{th}$ group identifiers from among the $1^{st}$ group identifiers may be used as service flow identifiers for emergency non-real-time Polling Service (nrtPS) traffic, and some service flow identifiers ($6^{th}$ group identifiers) from among the other identifiers except for the $2^{nd}$ to $5^{th}$ group identifiers from among the $1^{st}$ group identifiers may be used as service flow identifiers for other service traffic. Further, the BS 210 may allocate service flow identifiers optionally selected from among the $1^{st}$ group identifiers to the MS 200 regardless of the emergency service traffic type.

Meanwhile, when the QoS parameter and the global service class name are not predefined according to the traffic type of the emergency service, the QoS parameter and the global service class name included in the service flow information may be determined according to the type of the emergency service traffic to be provided by the MS 200. Hereinafter, for convenience of description, the service flow information and CID information corresponding to the service flow information are referred to as "service flow connection information." For example, the CID may be selected from a traffic CID set or an emergency service CID set separately defined for an emergency service.

Upon receiving the ranging request message, the BS 210 transmits a ranging response message including the determined service flow connection information to the MS 200 in step 209. Here, the ranging response message may include an indicator indicating a response to the emergency service connection setup request and Channel Quality Information (CQI) of a channel to be used by the MS 200.

Further, when all of the QoS parameter, the global service class name, and the service flow identifiers are predefined according to the traffic type of the emergency service, the service flow connection information may be provided to the MS 200 through emergency service CID update Type Length Value (TLV) defined for an emergency service or CID update TLV included in a registration message or ranging response message. Each of the CID update TLV and the emergency service CID update TLV includes a service flow identifier field and a New CID (New CID) field. The service flow identifier field includes a service flow identifier used for a corresponding emergency service traffic type, and the new CID field includes a CID corresponding to the service flow identifier.

The indicator information can be expressed by using one particular bit from among the bits included in a location update response field of the ranging response message, one particular bit from among the bits included in a header of the ranging response message, one particular bit from among the bits included in a HandOver (HO) process optimization field of the ranging response message, or an emergency service indicator field that can be newly defined in the ranging response message. Information on the CQI channel may be provided through a CQI CHannel Allocation Information Element (CQICH_Allocation_IE). The CQI channel may be used in transmitting the CQI to the BS. Based on the received CQI, the BS can determine a Modulation and Coding Scheme (MCS) level to be used for transmitting/receiving traffic to/from an MS using the emergency service. Upon receiving the ranging response message, in step 211, the MS 200 provides an emergency service according to the service flow connection information determined in step 207.

The above description with reference to FIG. 2 deals with an MS-triggered emergency service providing process. However, it goes without saying that the process shown in FIG. 2 can be applied to a BS-triggered emergency service providing process.

In the meantime, the ranging request message and the ranging response message transmitted/received by the MS and the BS for emergency service connection setup may include not only the information described above, but also information used for transmission/reception of an emergency call or an emergency message, such as subscriber basic capability information acquired through a capability request/response message or subscriber registration information acquired through a registration request/registration message. Further, the ranging response message may include information used for setting an Internet Protocol (IP) address. As used herein, the information used for setting an IP address includes a connection identifier of a flow of signal transmission for acquisition of an IP address, service flow information, etc. By using the connection identifier and the service flow information included in the ranging response message, the MS and the BS can omit the process of setting a flow used for acquisition of the IP address.

Next, a process in which an MS in an idle mode performs an emergency service providing operation together with a BS according to a first exemplary embodiment of the present invention will be described with reference to FIGS. 3 and 4. The process of performing an emergency service providing operation by an MS together with a BS, which will be described below with reference to FIGS. 3 and 4, is based on an assumption that the emergency service is, for example, an emergency call.

Figure 3:
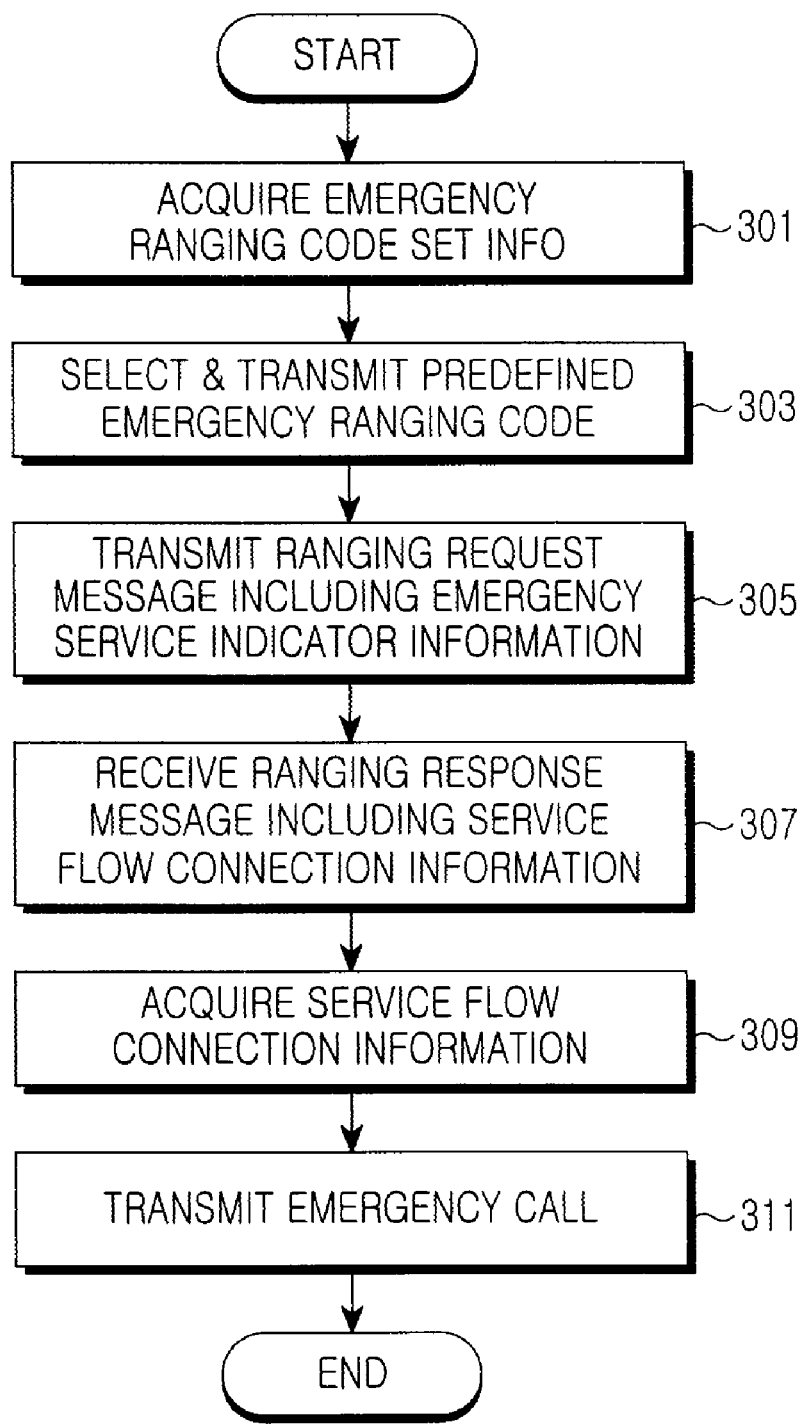
FIG. 3 is a flow diagram illustrating a process of providing an emergency service by an MS in an idle mode in cooperation with a BS according to a first exemplary embodiment of the present invention.
Figure 4:
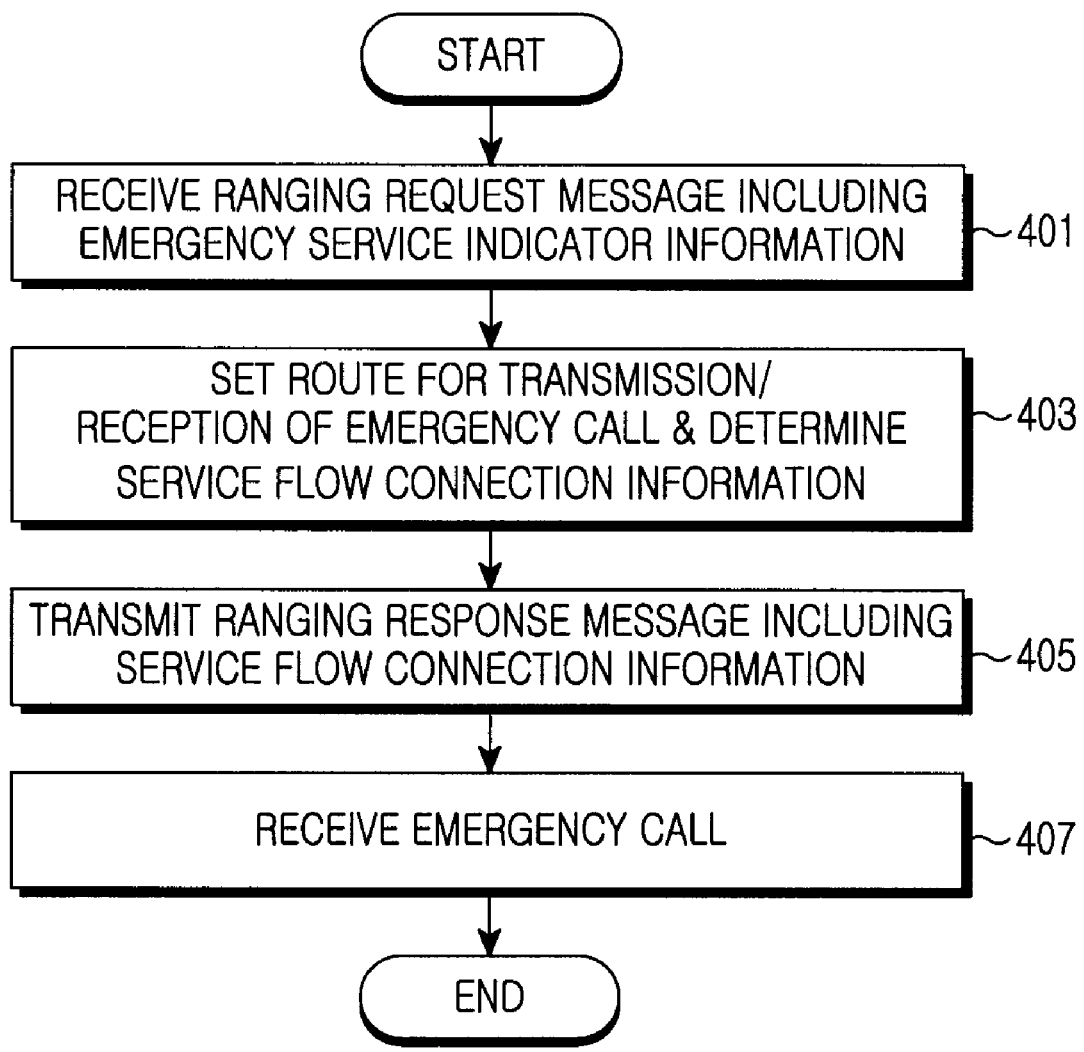
FIG. 4 is a flow diagram illustrating a process of providing an emergency service by a BS in cooperation with an MS in an idle mode according to the first exemplary embodiment of the present invention.

FIG. 3 is a flow diagram illustrating a process of providing an emergency service by an MS in an idle mode in cooperation with a BS according to the first exemplary embodiment of the present invention.

Referring to FIG. 3, in step 301, when an MS in an idle mode has determined that an emergency call is to be transmitted, the MS selects a BS to be connected for transmission of the emergency call, acquires information on an emergency ranging code set managed by the BS, and proceeds to step 303. As used herein, the emergency ranging code set refers to a set of emergency ranging codes. In step 303, the MS selects a predefined emergency ranging code from the acquired emergency ranging code set, and transmits the selected emergency ranging code to the BS. Then, in step 305, the MS transmits a ranging request message to the BS through a bandwidth allocated by the BS, and proceeds to step 307. As used herein, the ranging request message includes at least one of emergency service indicator information and identifier information of the MS, and may include QoS parameter information and global service class name information corresponding to the emergency service requested by the MS.

In step 307, the MS receives a ranging response message in response to the ranging request message from the BS, and proceeds to step 309. The ranging response message includes service flow connection information set for transmission of an emergency call. In step 309, the MS acquires the service flow connection information from the ranging response message, and proceeds to step 311. In step 311, the MS transmits an emergency call to the BS using the acquired service flow connection information.

FIG. 4 is a flow diagram illustrating a process of providing an emergency service by a BS in cooperation with an MS in an idle mode according to the first exemplary embodiment of the present invention.

Referring to FIG. 4, in step 401, a BS receives a ranging request message, which includes identifier information of an MS in an idle mode, emergency service indicator information, global service class name information, and QoS parameter information, from the MS. Then, in step 403, the BS sets a route for emergency call transmission/reception of the MS and entities of a backbone network, and determines service flow connection information for the emergency call transmission/reception. Then, in step 405, the BS transmits a ranging response message including the determined service flow connection information to the MS. Then, in step 407, the BS receives an emergency call from the MS using the determined service flow connection information.

Meanwhile, when all of the QoS parameter, global service class name, and service flow identifier are predefined according to the emergency service traffic type, the MS may transmit a ranging request message including only the predefined service flow identifier to the BS, to inform the BS of matters in relation to the emergency service used by the MS.

Next, a process in which an MS in an idle mode performs an emergency service providing operation together with a BS according to a second exemplary embodiment of the present invention will be described with reference to FIGS. 5 and 6. The process of performing an emergency service providing operation by an MS together with a BS, which will be described below with reference to FIGS. 5 and 6, is based on an assumption that the emergency service is, for example, an emergency message.

Figure 5:
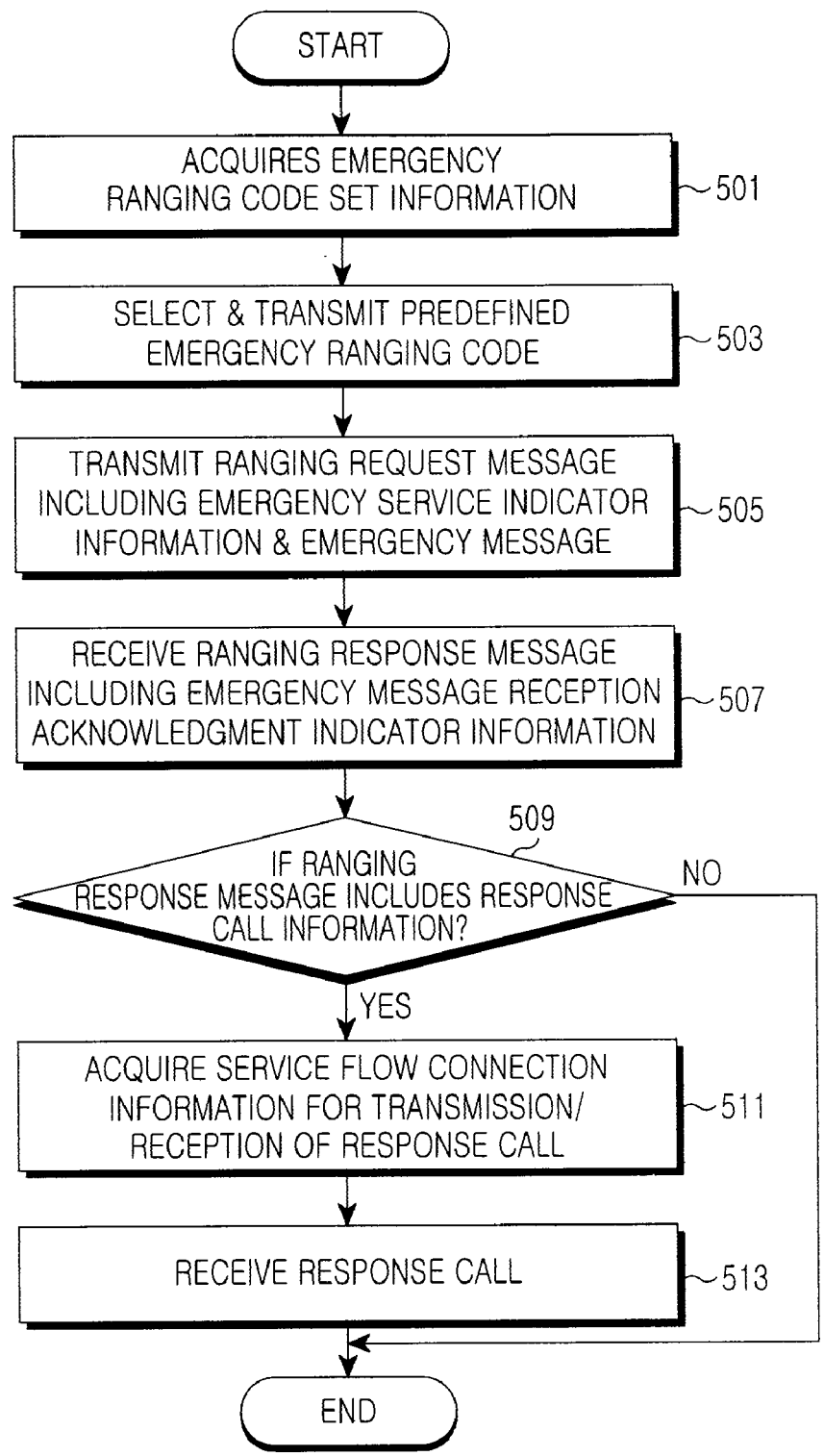
FIG. 5 is a flow diagram illustrating a process of providing an emergency service by an MS in an idle mode in cooperation with a BS according to a second exemplary embodiment of the present invention.
Figure 6:
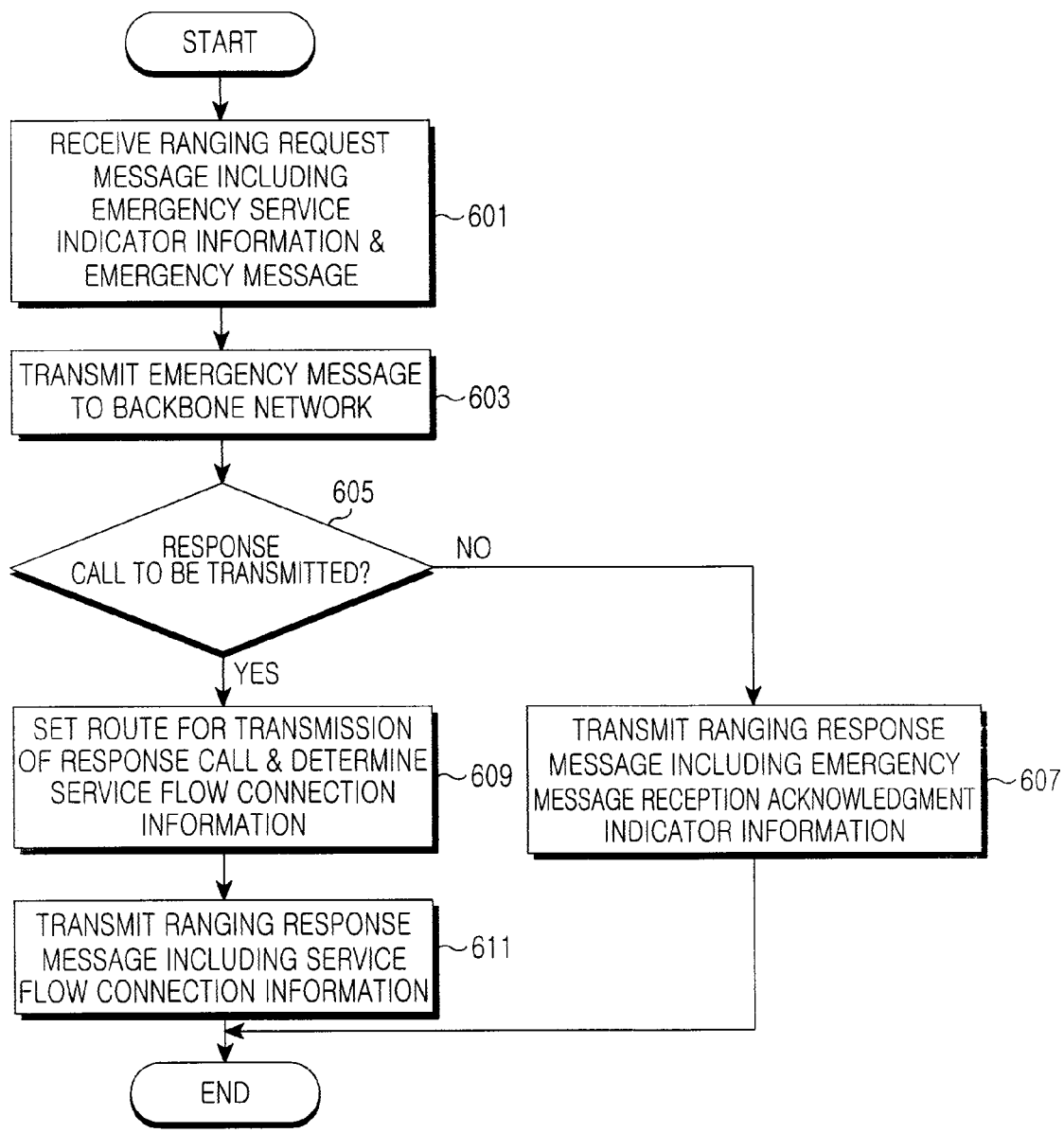
FIG. 6 is a flow diagram illustrating a process of providing an emergency service by a BS in cooperation with an MS in an idle mode according to the second exemplary embodiment of the present invention.

FIG. 5 is a flow diagram illustrating a process of providing an emergency service by an MS in an idle mode in cooperation with a BS according to the second exemplary embodiment of the present invention.

Referring to FIG. 5, in step 501, when an MS in an idle mode has determined that an emergency message is to be transmitted, the MS selects a BS to be connected for transmission of the emergency message, and acquires information on an emergency ranging code set managed by the BS. Then, in step 503, the MS selects a predefined emergency ranging code from the acquired emergency ranging code set, transmits the selected emergency ranging code to the BS, and proceeds to step 505. In a system in which the emergency ranging code set is not defined, the MS may select a predefined ranging code from an initial ranging code set or a handover ranging code set and transmit the selected ranging code to the BS. In step 505, the MS transmits a ranging request message to the BS through a bandwidth allocated by the BS, and proceeds to step 507. As used herein, the ranging request message includes identifier information of the MS, emergency service indicator information, and an emergency message. The emergency message includes, for example, location information of the MS.

In step 507, the MS receives a ranging response message in response to the ranging request message from the BS, and proceeds to step 509. The ranging response message may include acknowledgment indicator information indicating that the BS has received the emergency message. The acknowledgment indicator information can be expressed by using one bit of a header of the ranging response message or one particular bit from among bits included in a location update response field of the ranging response message. Upon receiving the ranging response message, in step 509, the MS determines if the ranging response message includes response call information. If the ranging response message includes response call information, the MS proceeds to step 511. If the ranging response message does not include response call information, the MS ends the process. As used herein, the response call information includes service flow connection information for transmission of an emergency call from the BS to the MS having transmitted the emergency message.

In step 511, the MS acquires service flow connection information for transmission/reception of a response call from the ranging response message, and proceeds to step 513. In step 513, the MS receives a response call with respect to the emergency message, which has been transmitted in step 505, from the BS.

FIG. 6 is a flow diagram illustrating a process of providing an emergency service by a BS in cooperation with an MS in an idle mode according to the second exemplary embodiment of the present invention.

Referring to FIG. 6, in step 601, a BS receives a ranging request message, which includes identifier information of an MS in an idle mode, emergency service indicator information, and an emergency message, from the MS. In step 603, the BS transmits the emergency message to an emergency service traffic processing center included in a backbone network. In step 605, the emergency service traffic processing center determines if a response call is to be transmitted to the MS having transmitted the emergency message. When a response call is not to be transmitted to the MS, step 607 is performed. In step 607, the BS transmits a ranging response message including acknowledgment indicator information, which indicates that the BS has received the emergency message, to the MS.

Meanwhile, when the emergency service traffic processing center determines in step 605 that a response call to the MS having transmitted the emergency message is to be transmitted, the BS performs step 609. In step 609, the BS sets a route for transmission of the response call, determines service flow connection information for transmission of the response call, and proceeds to step 611. In step 611, the BS transmits a ranging response message including the determined service flow connection information to the MS.

Hereinafter, an exemplary method of notifying termination of the emergency service connection when an MS wants to interrupt transmission of the emergency service traffic during the emergency service providing operation by the MS and the BS will be described.

1. Bandwidth Request Header, Bandwidth Request Sub-Header:

An MS transmits a bandwidth request sub-header or a bandwidth request header, a bandwidth quantity of which may be 0, to a BS. The bandwidth request sub-header may be, for example, a grant management sub-header.

2. CQI Code:

The MS transmits a separate CQI code, which is defined in order to request release of emergency service connection, to the BS through a CQI channel.

3. Dynamic Service Deletion Request Message:

The MS transmits a dynamic service flow deletion request message including service flow information for an emergency service to the BS, and receives a dynamic service deletion response message including the deleted service flow information from the BS.

4. Extended Sub-Header:

The MS transmits an extended sub-header, which is newly defined in order to request release of emergency service connection, to the BS. The newly defined extended sub-header includes, for example, a CID of the emergency service flow.

5. Deregistration Request Message:

When the MS wants to terminate the emergency service, the MS transmits a deregistration request message to the BS. The BS transmits a deregistration command message in response to the deregistration request message. An emergency service terminating process using the deregistration request message may be used when an unauthenticated MS has received support for an emergency service. That is to say, in the case where an emergency service is provided to an MS having entered a network in pursuit of support for the emergency service without authentication of the MS, when the emergency service is terminated, the BS may deregister the resources allocated for the emergency service of the MS, such as a connection identifier and a service flow identifier, and may not support the service for the MS any longer. Therefore, when the MS has not been authenticated, the BS deregisters the MS from the BS by using the deregistration request message and the deregistration command message.

Meanwhile, the BS, which has received at least one of a bandwidth request header, a bandwidth request sub-header, a CQI code, a dynamic service deletion request message, an extended sub-header, and a deregistration request message as described above, releases the emergency service connection to the MS. At this time, if the MS having requested the emergency service has been authenticated, it is possible to continue the typical traffic transmission/reception after the release of the emergency service connection. However, if the MS having requested the emergency service has not been authenticated, the MS is deregistered from the BS after the release of the emergency service connection.

The above description with reference to FIGS. 2 to 6 deals with an operation of an MS for receiving information used for an emergency service by using a ranging process of a network entry/reentry process.

Now, an operation of an MS for providing an emergency service through a service flow setup process will be described with reference to FIGS. 7 and 8. The emergency service providing operation, which will be described with reference to FIGS. 7 and 8, can be applied to an MS having completed a network entry process or a network reentry process.

Figure 7:
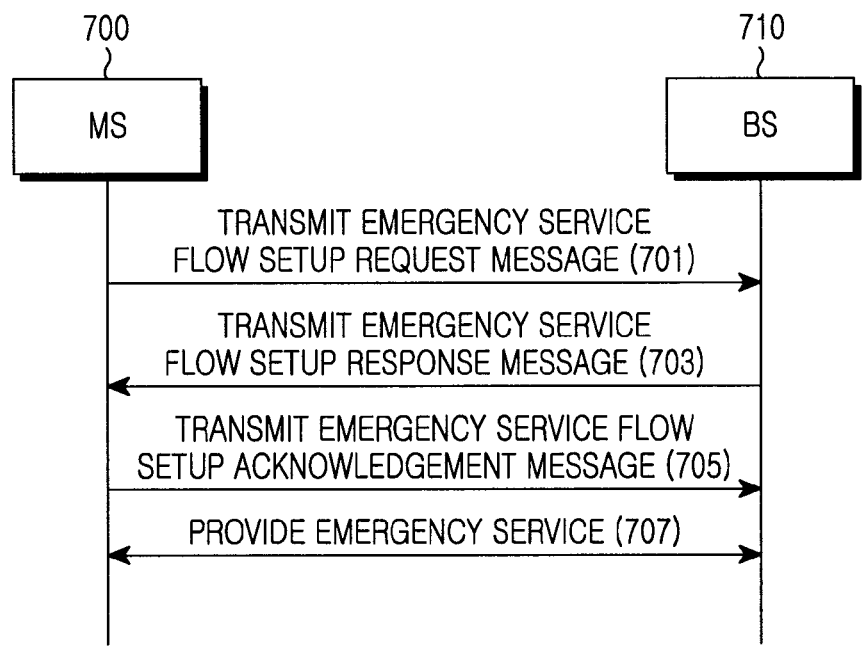
FIG. 7 is a signal flow diagram illustrating a process of providing an emergency service by an MS in cooperation with a BS according to a third exemplary embodiment of the present invention.

FIG. 7 is a signal flow diagram illustrating a process of providing an emergency service by an MS in cooperation with a BS according to a third exemplary embodiment of the present invention.

Referring to FIG. 7, an MS 700 transmits a service flow setup (e.g. emergency service flow setup) request message for setup of an emergency service connection to a BS 710 in step 701. The emergency service flow setup request message may include identifier information of the MS, emergency service indicator information indicating that it is an emergency service connection setup request, a QoS parameter according to the emergency service traffic type, and global service class name information. As a format of the emergency service indicator, an emergency service TLV can be used. Further, a value of the TLV can be interpreted to indicate existence or absence of an emergency service. For example, when the TLV has a value of "1," the request of step 701 can be interpreted as "an emergency flow setup request." Although an emergency service TLV is used as an example of a format of the emergency service indicator in the above description, it is also possible to use one particular bit capable of indicating existence or absence of an emergency service as a format of the emergency service indicator. Further, this TLV can be interpreted to indicate the emergency service traffic type. For example, a TLV having a value of "1" can be interpreted to indicate an emergency UGS traffic, a TLV having a value of "2" can be interpreted to indicate an emergency ertPS traffic, a TLV having a value of "3" can be interpreted to indicate an emergency rtPS traffic, a TLV having a value of "4" can be interpreted to indicate an emergency nrtPS traffic, and a TLV having a value of "5" can be interpreted to indicate other service traffic.

Upon receiving the emergency service flow setup request message, the BS 710 transmits an emergency service flow setup response message, which includes service flow connection information for provision of an emergency service and response indicator information indicating that it is a response to the emergency service flow setup request, to the MS 700 in step 703. As the response indicator information, it is possible to use an emergency service TLV. At this time in the example, the TLV is set to "1." Further, when the emergency service TLV is used to indicate the emergency service traffic type, the TLV may be set to have a value according to the emergency service traffic type.

Upon receiving the emergency service flow setup response message, the MS 700 acquires the service flow connection information, which includes service flow information and CID information, and transmits an emergency service flow setup acknowledgment message to the BS 710 in step 705. Thereafter, the MS 700 provides an emergency service according to the acquired service flow information and CID information in step 707. An emergency service provided through the set emergency service flow can be processed as a traffic having a higher priority than normal services.

Figure 8:
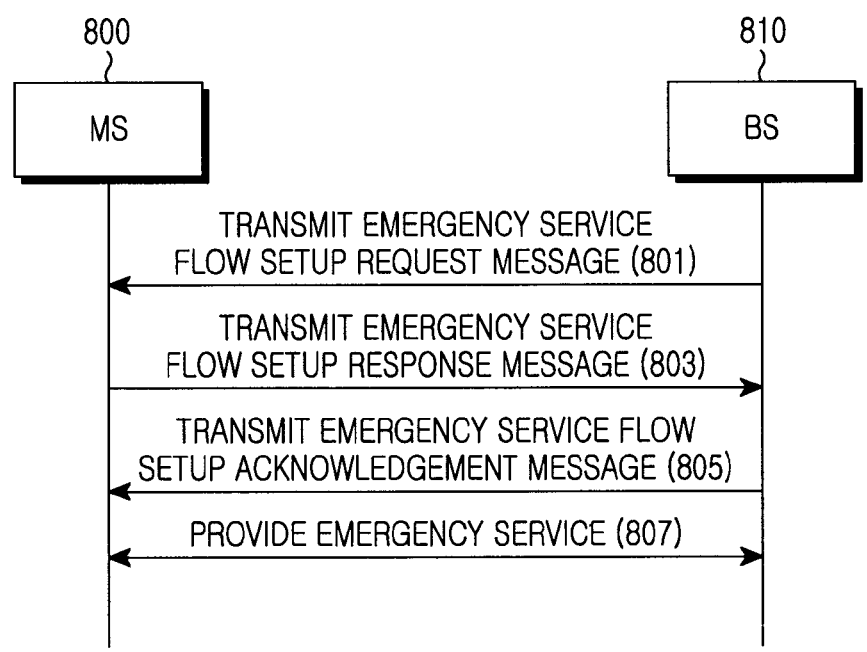
FIG. 8 is a signal flow diagram illustrating a process of providing an emergency service by a BS in cooperation with an MS according to the third exemplary embodiment of the present invention.

FIG. 8 is a signal flow diagram illustrating a process of providing an emergency service by a BS in cooperation with an MS according to the third exemplary embodiment of the present invention.

Referring to FIG. 8, the BS 810 transmits an emergency service flow setup request message to the MS 800 in step 801. The emergency service flow setup request message may include service flow information, emergency service CID, and emergency service indicator information indicating that it is an emergency service connection setup request. As the emergency service indicator information, an emergency service TLV or one particular bit may be used.

Upon receiving the emergency service flow setup request message, the MS 800 acknowledges the service flow information, and transmits an emergency service flow setup response message to the BS 810 as a response to the emergency service flow setup request message in step 803. The emergency service flow setup response message may include service flow connection information for provision of an emergency service and response indicator information indicating that it is a response to the emergency service flow setup request. As the response indicator information, it is possible to use the emergency service TLV or one particular bit. An emergency service provided through the set emergency service flow can be processed as a traffic having a higher priority than non-emergency services.

In the exemplary embodiment shown in FIGS. 7 and 8, when the emergency service TLV is used as an example of the indicator included in the service flow setup request/response message, that is, when the emergency service TLV is included in the service flow setup request/response message, a Multicast Broadcast Service (MBS) TLV may not be included therein.

Meanwhile, when the MS using the emergency service is performing handover from a serving BS to a target BS, the service flow information used in providing the emergency service by the MS in cooperation with the serving BS can be transmitted to the target BS, so that the MS can continue performing the emergency service providing operation in cooperation with the target BS.

At this time, if each of the serving BS and the target BS independently manages a commonly used emergency flow identifier pool, only the service flow identifier information from among the service flow information can be transmitted to the target BS, so that the serving BS and the target BS can share the service flow information. In contrast, when each of the serving BS and the target BS does not independently manage a commonly used emergency flow identifier pool, the service flow information and the emergency service indicator can be transmitted to the target BS, so that the serving BS and the target BS can share the service flow information. The service flow information and the emergency service indicator may include the QoS parameter, a global service class name, an emergency service TLV, etc.

In order to continue performing the emergency service transmission/reception, which has been performed in cooperation with the serving BS, in cooperation with the target BS, the MS may be allocated CID information corresponding to the service flow. At this time, the CID information may be provided to the MS by using CID update TLV, emergency service CID update TLV, etc. For example, the CID may be selected from a traffic CID set or an emergency service CID set separately defined for the emergency service.

Figure 9:
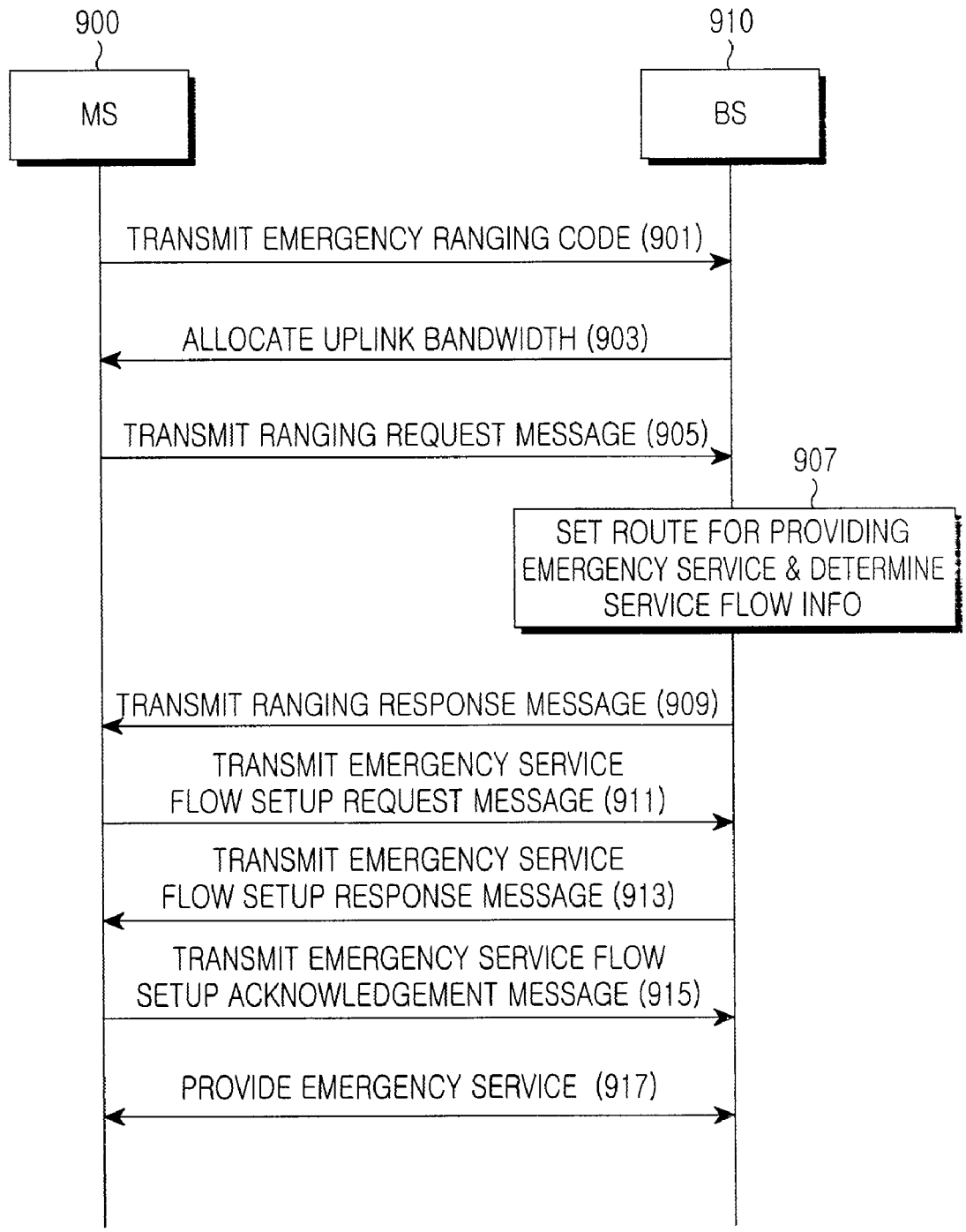
FIG. 9 is a signal flow diagram illustrating a process of providing an emergency service by an MS in cooperation with a BS according to a fourth exemplary embodiment of the present invention.

FIG. 9 is a signal flow diagram illustrating a process of providing an emergency service by an MS in cooperation with a BS according to a fourth exemplary embodiment of the present invention.

The following description with reference to FIG. 9 is an example of an MS-triggered emergency service providing process.

Referring to FIG. 9, in step 901, the MS 900 transmits an emergency ranging code, which is newly proposed by an exemplary embodiment of the present invention in order to set a connection for providing an emergency service, to the BS 910. The BS 910 allocates an uplink bandwidth for transmission of a ranging request message to the MS 900 having transmitted the emergency ranging code in step 903. In steps 901 to 903, an initial ranging code or a handover ranging code may be used instead of the emergency ranging code.

Then, the MS 900 transmits a ranging request message, which includes identifier information of the MS and emergency service indicator information, to the BS 910 by using the allocated uplink bandwidth in step 905. Upon receiving the ranging request message, the BS 910 sets a route for emergency service provision of the MS 900 and entities of a backbone network, and determines service flow information for providing the emergency service of the MS and CID information corresponding to the service flow in step 907. Steps 901 to 907 are substantially similar to steps 201 to 207 of FIG. 2, so a more detailed description thereof will be omitted here. Upon receiving the ranging request message, the BS sets a route for emergency service provision of the MS and entities of a backbone network, and determines information used for setup of an IP address of the MS, which includes a connection identifier of a flow for transmission of a signal for acquisition of the IP address and service flow information.

Upon receiving the ranging request message, the BS 910 transmits a ranging response message, which includes indicator information indicating that it is a response to the emergency service connection setup request, to the MS 900 in step 909. The ranging response message may include information on a CQI channel to be used by the MS 900. The information on the CQI channel may be provided through a CQI channel allocation information element.

When the ranging response message includes only the indicator information without service flow connection information, the MS 900 having received the ranging response message transmits an emergency service flow setup request message, which includes emergency service indicator information indicating that it is an emergency service connection setup request, to the BS 910 in step 911. Upon receiving the emergency service flow setup request message, the BS 910 transmits an emergency service flow setup response message, which includes service flow connection information for provision of the emergency service and response indicator information indicating that it is a response to the emergency service flow setup request, to the MS 900 in step 913. At this time, if the ranging response message includes both the service flow connection information and the indicator information, a typical service flow setup request message, which does not include the emergency service indicator information, and a service flow setup response message to the typical service flow setup request message are transmitted.

After receiving the emergency service flow setup response message, the MS 900 acquires the service flow connection information, which includes service flow information and CID information, and transmits an emergency service flow setup acknowledgment message to the BS 910 in step 915. Thereafter, the MS 900 provides the emergency service according to the acquired service flow information and CID information in step 917. Steps 911 to 917 are substantially similar to steps 701 to 707 of FIG. 7, so a more detailed description thereof is omitted here.

The above description with reference to FIG. 9 deals with an MS-triggered emergency service providing process. However, it goes without saying that the process shown in FIG. 9 can be applied to a BS-triggered emergency service providing process.

Exemplary embodiments of the present invention enables provision of a service in a communication system, especially in an IEEE 802.16 communication system, with reduced delay as compared to the conventional art. Therefore, exemplary embodiments of the present invention can improve the performance of an IEEE 802.16 communication system.

While the invention has been shown and described with reference to certain exemplary embodiments thereof, it will be understood by those skilled in the art that various changes in form and details may be made therein without departing from the spirit and scope of the invention as defined by the appended claims and their equivalents.

What is claimed is:

1. A method of providing an emergency service in a communication system, the method comprising:
transmitting a request message for requesting connection setup for service provision from a first station to a second station, the request message including a first indicator indicating an emergency service;
receiving a response message in response to the request message by the first station from the second station, the response message including service flow connection information for provision of the emergency service and a second indicator indicating that it is a response to the request message;
acquiring the service flow connection information from the response message and transmitting a message acknowledging acquisition of the service flow connection information to the second station; and
setting a connection for providing the emergency service, wherein the service flow connection information comprises service flow information and connection identifier information corresponding to service flow.

2. The method of claim 1, wherein an emergency service Type Length Value (TLV) is used as a format of the first indicator and the second indicator, and the TLV has a value indicating that a message associated therewith is for the emergency service.

3. The method of claim 1, wherein the service flow information comprises at least one of a service flow identifier, a Quality of Service (QoS) parameter, and a global service class name.

4. The method of claim 1, further comprising transmitting, by a mobile station, the service flow connection information used in providing the emergency service in cooperation with a serving base station, to a target base station, when the mobile station using the emergency service is performing handover from the serving base station to the target base station.

5. An emergency service providing system in a communication system, the system comprising a first station and a second station,
wherein the first station, transmits a request message for requesting connection setup for service provision to the second station, the request message including a first indicator indicating an emergency service, receives a response message in response to the request message from the second station, the response message including service flow connection information, which comprises service flow information and connection identifier information corresponding to service flow, for provision of the emergency service and a second indicator indicating that it is a response to the request message, acquires the service flow connection information from the response message, and transmits a message acknowledging acquisition of the service flow connection information to the second station.

6. The system of claim 5, wherein an emergency service TLV is used as a format of the first indicator and the second indicator, and the TLV has a value indicating that a message associated therewith is for the emergency service.

7. The system of claim 5, wherein the service flow information comprises at least one of a service flow identifier, a Quality of Service (QoS) parameter, and a global service class name.

8. The system of claim 5, wherein the first station transmits the service flow connection information used in providing the emergency service in cooperation with a serving base station, to a target base station, when the first station using the emergency service is performing handover from the serving base station to the target base station.

9. A method of providing an emergency service by a mobile station in a communication system, the method comprising:
transmitting an emergency ranging code to a base station when the mobile station has determined that the emergency service is to be provided;

receiving information on an uplink band allocated to the mobile station from the base station;

transmitting a first message, which requests a connection for provision of the emergency service through the uplink band;

receiving a second message, which includes a first indicator indicating that it is a response to the request for the connection, from the base station;

transmitting a request message for requesting connection setup for service provision to the base station, the request message including a second indicator indicating the emergency service;

receiving a response message from the base station, the response message including service flow connection information for provision of the emergency service and a third indicator indicating that it is a response to the request message;

acquiring the service flow connection information from the response message, and transmitting an acknowledgement message, which acknowledges acquisition of the service flow connection information to the base station; and setting the connection.

10. The method of claim 9, wherein the first message comprises identifier information of the mobile station, and indicator information indicating that it is a request for the connection.

11. The method of claim 9, wherein the second message further comprises information on a Channel Quality Information (CQI) channel.

12. A method of providing an emergency service by a base station in a communication system, the method comprising:

receiving an emergency ranging code from a mobile station;

allocating an uplink band for the mobile station and transmitting information on the uplink band to the mobile station;

receiving a first message, which requests a connection for provision of the emergency service, from the mobile station through the uplink band;

transmitting a second message, which includes a first indicator indicating that it is a response to the request for the connection, to the mobile station;

receiving a request message for requesting connection setup for service provision from the mobile station, the request message including a second indicator indicating the emergency service;

transmitting a response message to the mobile station, the response message including service flow connection information for provision of the emergency service and a third indicator indicating that it is a response to the request message;

receiving an acknowledgment message, which acknowledges acquisition of the service flow connection information from the response message, from the mobile station; and setting the connection.

13. The method of claim 12, wherein the first message comprises identifier information of the mobile station, and indicator information indicating that it is a request for the connection.

14. The method of claim 12, wherein the second message further comprises information on a Channel Quality Information (CQI) channel.

15. An emergency service providing system in a communication system, the system comprising a mobile station and a base station, wherein the mobile station transmits an emergency ranging code to the base station when determining that the emergency service is to be provided, receives information on an uplink band allocated to the mobile station from the base station, transmits a first message, which requests a connection for provision of the emergency service through the uplink band, receives a second message, which includes a first indicator indicating that it is a response to the request for the connection, from the base station, transmits a request message for requesting connection setup for service provision to the base station, the request message including a second indicator indicating the emergency service, receives a response message from the base station, the response message including service flow connection information for provision of the emergency service and a third indicator indicating that it is a response to the request message, acquires the service flow connection information from the response message, transmits an acknowledgement message, which acknowledges acquisition of the service flow connection information to the base station, and sets the connection.

16. The system of claim 15, wherein the first message comprises identifier information of the mobile station, and indicator information indicating that it is a request for the connection.

17. The system of claim 15, wherein the second message further comprises information on a Channel Quality Information (CQI) channel.

18. An emergency service providing system in a communication system, the system comprising a mobile station and a base station, wherein the base station receives an emergency ranging code from the mobile station, allocates an uplink band for the mobile station, transmits information on the uplink band to the mobile station, receives a first message, which requests a connection for provision of the emergency service, from the mobile station through the uplink band, transmits a second message, which includes a first indicator indicating that it is a response to the request for the connection, to the mobile station, receives a request message for requesting connection setup for service provision from the mobile station, the request message including a second indicator indicating the emergency service, transmits a response message to the mobile station, the response message including service flow connection information for provision of the emergency service and a third indicator indicating that it is a response to the request message, receives an acknowledgment message, which acknowledges acquisition of the service flow connection information from the response message, from the mobile station, and sets the connection.

19. The system of claim 18, wherein the first message comprises identifier information of the mobile station, and indicator information indicating that it is a request for the connection.

20. The system of claim 18, wherein the second message further comprises information on a Channel Quality Information (CQI) channel.

21. A method of providing an emergency service by a mobile station in a communication system, the method comprising:

transmitting an emergency ranging code to a base station when the mobile station has determined that the emergency service is to be provided;

receiving information on an uplink band allocated to the mobile station from the base station;

transmitting a first message, which requests a connection for provision of the emergency service through the uplink band;

receiving a second message, which includes at least one of an indicator indicating that it is a response to the request for the connection, service flow connection information for provision of the emergency service, information on a Channel Quality Information (CQI) channel, from the base station; and providing the emergency service by using the service flow connection information.

22. The method of claim 21, wherein the first message comprises identifier information of the mobile station, and indicator information indicating that it is a request for the connection.

23. A method of providing an emergency service by a base station in a communication system, the method comprising:

receiving an emergency ranging code from a mobile station;

allocating an uplink band for the mobile station and transmitting information on the uplink band to the mobile station;

receiving a first message, which requests a connection for provision of the emergency service, from the mobile station through the uplink band; and transmitting a second message, which includes at least one of an indicator indicating that it is a response to the request for the connection, service flow connection information for provision of the emergency service, information on a Channel Quality Information (CQI) channel, to the mobile station.

24. The method of claim 23, wherein the first message comprises identifier information of the mobile station, and indicator information indicating that it is a request for the connection.

25. An emergency service providing system in a communication system, the system comprising a mobile station and a base station, wherein the mobile station transmits an emergency ranging code to a base station when determining that the emergency service is to be provided, receives information on an uplink band allocated to the mobile station from the base station, transmits a first message, which requests a connection for provision of the emergency service through the uplink band, receives a second message, which includes at least one of an indicator indicating that it is a response to the request for the connection, service flow connection information for provision of the emergency service, information on a Channel Quality Information (CQI) channel, from the base station, and provides the emergency service by using the service flow connection information.

26. The system of claim 25, wherein the first message comprises identifier information of the mobile station, and indicator information indicating that it is a request for the connection.

27. An emergency service providing system in a communication system, the system comprising a mobile station and a base station, wherein the base station receives an emergency ranging code from a mobile station, allocates an uplink band for the mobile station, transmits information on the uplink band to the mobile station, receives a first message, which requests a connection for provision of the emergency service, from the mobile station through the uplink band, and transmits a second message, which includes at least one of an indicator indicating that it is a response to the request for the connection, service flow connection information for provision of the emergency service, information on a Channel Quality Information (CQI) channel, to the mobile station.

28. The system of claim 27, wherein the first message comprises identifier information of the mobile station, and indicator information indicating that it is a request for the connection.

* * * * *